Patented Dec. 30, 1947

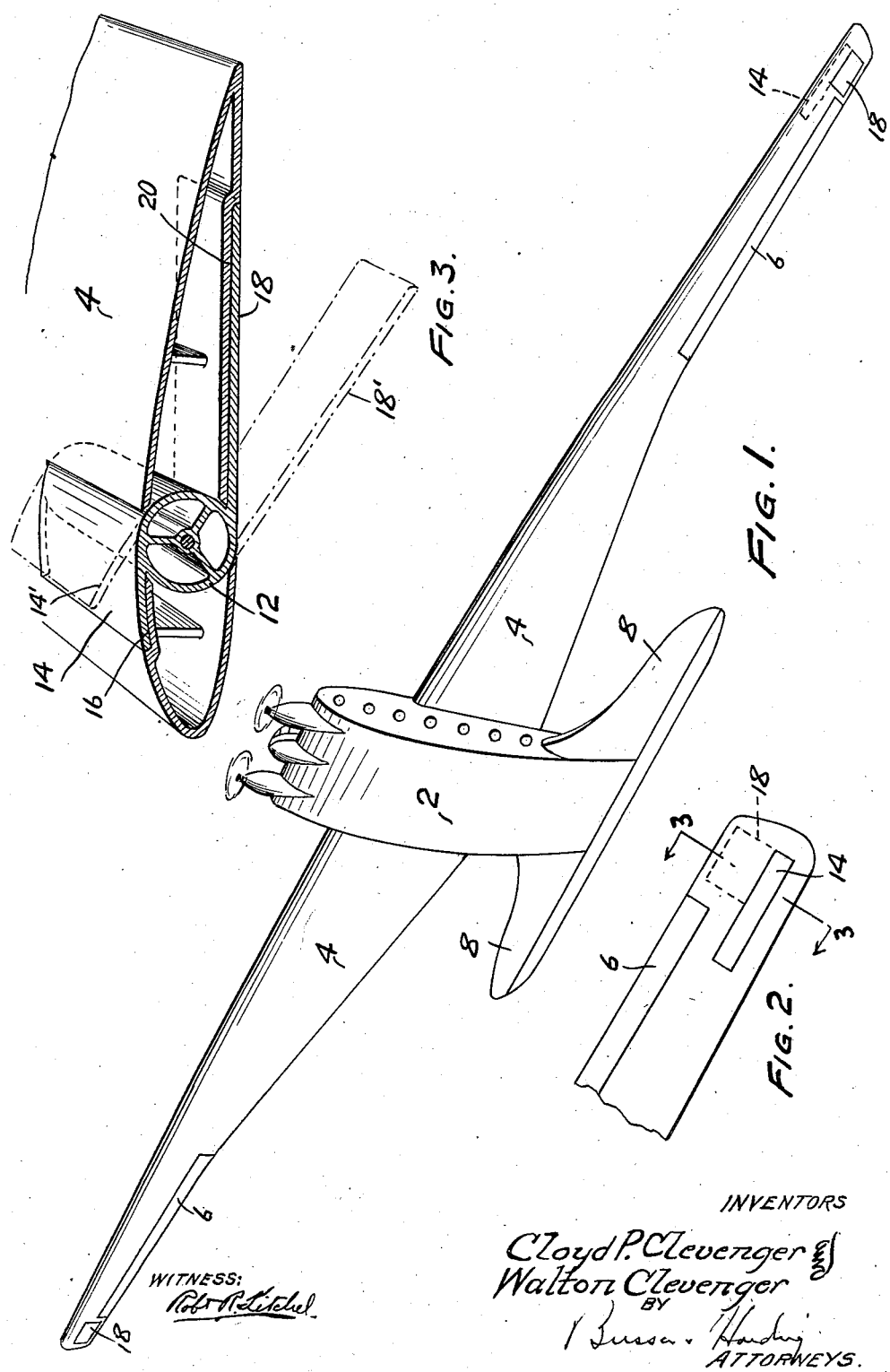

2,433,649

UNITED STATES PATENT OFFICE 2,433,649

AIRCRAFT CONTROL SURFACES FOR YAW CONTROL

Cloyd P. Clevenger and Walton Clevenger, Miami, Fla.

Application March 14, 1944, Serial No. 526,379

4 Claims. (Cl. 244—75)

This invention relates to aircraft and has particular reference to the control of yaw by variation of wing tip resistance as contrasted with the use of a rudder.

The use of a rudder involves the necessity for the provision of a sufficiently long fuselage to enable the rudder to produce an effective torque for its control action. In such design the aspect ratio must suffer because if the plane has a greater wing span, the fuselage must be built correspondingly longer, adding weight and total resistance. Desirably, however, the fuselage should be short to save weight and resistance and the wings should be of high aspect ratio for better efficiency.

Proposals have been made, as for example in Martin Patent 1,771,053, dated July 22, 1930, to effect yaw control by resistance at the wing tips. The systems proposed, however, have failed properly to achieve the result desired in that when the drag of resistance at the wing tips is increased, there is involved a loss of lift which upsets the lateral balance of the airplane.

The broad object of the present invention is the provision of a wing tip yaw control so balanced as to effect smooth variations in resistance at one wing tip or the other to yaw the plane to any desired extent, but at the same time to avoid affecting the lift of the wing which would tend to throw the plane out of lateral balance.

This, and other objects of the invention, particularly relating to details of arrangement and operation, will be apparent from the following description, read in conjunction with the accompanying drawing, in which Figure 1 is an underside perspective view of a plane of the "flying wing" type, provided with controls in accordance with the invention;

Figure 2 is a top plan view of a wing tip to which the invention is applied; and Figure 3 is a perspective section taken on the plane indicated at 3—3 in Figure 2.

The plane is illustrated as comprising a short section fuselage 2 associated with wings 4 having ailerons 6 and stabilizers 8 combined with an elevator 10. To the extent indicated, the plane is of known type with the parts illustrated so proportioned as to constitute what is generally known as a flying wing. Near each wing tip there is provided a rotary support 12 carrying at the upper surface of the wing an element 14 which, by analogy to similar elements provided in connection with gliders, may be called a spoiler. When closed this spoiler 14 is arranged to enter a depression 16 in the upper wing surface to present externally a smooth continuation of the adjacent portions of the wing surface.

Also secured to the rotary support 12 at the lower side of the wing is a flap 18 which, when in closed position, enters a depression 20 in the lower wing surface and provides a smoothly continuous surface on the underside of the wing.

With the flap and spoiler as shown in full lines in Figure 3 the contour of the wing is conventional and the portion in the vicinity of the elements just named is a proper airfoil section contributing its proportional part of the lift to the wing.

To add resistance at a wing tip to effect yaw control the member 12 is rotated to a degree such, for example, as to project the spoiler 14 in the position illustrated at 14' and the flap 18 in the position indicated at 18'. The major part of the resistance is due to the flap portion of the control, though some occurs due to the projection of the spoiler above the wing. The downward projection of the flap portion of the control will increase lift, and the major purpose of the spoiler is to compensate for this increased lift by producing burbling, causing the upper side of the wing to lose lift to an extent which is a function of the degree of opening of the spoiler. In accordance with the invention, the proportioning of the spoiler and flap are such that the net change of lift due to the combination is substantially zero, so that the yaw controlling resistance which is offered by the combination is not accompanied by change of lift and, consequently, the lateral stability of the plane is maintained.

It has been found that with a wing of usual airfoil form this end can be accomplished by having the spoiler approximately twice as long in the direction of lateral extent of the wing as the flap, with the flap, however, extended fore and aft to such degree as to have an area about 75 per cent greater than the spoiler. It will be understood that these proportions are merely illustrative, and are subject to variation depending upon the particular section of the wing at the location of the control elements and the placing of the control elements in a location fore and aft of the wing, as contrasted with the location approximately as illustrated in Figure 3. It will be readily apparent, however, to those skilled in the art how these elements may be differently proportioned to secure the desired results. In any event it is desirable not only to have neutralization of lift effected as described but also to have the proportions such that the spoiler and flap will tend to move toward closed position under the action of the air stream.

The rotary support 12 may be operated in any suitable fashion through cables, pulleys, rods, or torque tubes, or indirectly on larger airplanes by tabs with such arrangement that the control on the right wing tip may be opened by the pilot's right foot pedal and the left-hand control by the pilot's left foot pedal, or other arrangements as may be desired, these forming no part of the present invention.

By the use of the arrangements as illustrated, a smooth yaw control may be effected depending upon the degree of opening of the spoiler and flap. Inasmuch as the lift of the wing on which the control is active is not affected, the steering action does not disturb the lateral balance.

The yaw control must be powerful enough to control the desired right and left movements of the airplane, overpowering all forces affecting yaw such as air bumps, aileron drag, the loss of one motor in a bimotored ship, any off-side resistance such as a damaged wing or deicer, and autorotation which exists in spins. For instance, if the right aileron is lowered, whether in straight flight or turning, it causes resistance at the wing tip and tries to turn the airplane, and the yaw control must be applied to the left, in this case, sufficient to prevent the nose from yawing to the right. In straight flight if the airplane were perfectly balanced laterally and directionally, both yaw controls would be normally in their entirely closed position. However, such ideal conditions seldom last any length of time. If a bump depresses the left wing, the lateral control would be moved to depress the left aileron so as to lift that wing, and this would necessitate a slight opening of the right drag unit to counteract the increased drag of the lowered left aileron. Consequently, it will be seen that the present yaw control must in flight be operated in correlation with the other controls.

Most ships are out of directional balance; i. e., if the pilot's feet were removed from the rudder pedals, the ship would yaw to the right or left; and if a bimotered ship loses one motor, the ship is excessively out of directional balance. If the right motor should quit, there is a powerful yaw tendency to the right. This may be counteracted by the yaw control.

To avoid the necessity for the pilot's carrying a constant offside pressure on the controls, a tab has been generally fitted on the rudder. This may be adjusted by the pilot to allow for any offside control pressure. In the present instance, this can be taken care of very simply by providing an adjustable stop controllable from the cockpit to hold one or the other of the drag units slightly open without pressure on the part of the pilot to compensate for directional unbalance.

The control may be used in conjunction with a rudder if desired as an auxiliary to step up the effectiveness of yaw control in a short-fuselage ship equipped with a rudder. On the other hand, and as illustrated, it may provide the sole yaw control.

It will be evident that departures from the specific disclosure may be made without departing from the fundamental aspects of the invention as defined in the following claims.

What we claim is:

1. In an aircraft having laterally extending wing structures, devices for providing different variable resistances for yaw control at the outer portions of the wing structures, each device comprising means arranged to be projected above the wing structure between the leading and trailing edges thereof to alter the air flow thereover, and means arranged to be projected below the wing structure to produce lift counteracting loss of lift occasioned by the action of the first mentioned means, said means being interconnected for simultaneous movement and so constructed and arranged that substantially constant lift is achieved with variable resistance at each such device.

2. In an aircraft having laterally extending wing structures, devices for providing different variable resistances for yaw control at the outer portions of the wing structures, each device comprising means arranged to be projected above the wing structure between the leading and trailing edges thereof to alter the air flow thereover, and means in the form of a flap arranged to be projected below the wing structure to produce lift counteracting loss of lift occasioned by the action of the first mentioned means, said means being interconnected for simultaneous movement and so constructed and arranged that substantially constant lift is achieved with variable resistance at each such device.

3. In an aircraft having laterally extending wing structures, devices for providing different variable resistances for yaw control at the outer portions of the wing structures, each device comprising means arranged to be projected above the wing structure between the leading and trailing edges thereof to alter the air flow thereover, means arranged to be projected below the wing structure to produce lift counteracting loss of lift occasioned by the action of the first mentioned means, and a common pivotal support for said means so that they have corresponding angular movements, said first and second means being so constructed and arranged that substantially constant lift is achieved with variable resistance at each such device.

4. In an aircraft having laterally extending wing structures, devices for providing different variable resistances for yaw control at the outer portions of the wing structures, each device comprising means arranged to be projected above the wing structure between the leading and trailing edges thereof to alter the air flow thereover, means in the form of a flap arranged to be projected below the wing structure to produce lift counteracting loss of lift occasioned by the action of the first mentioned means, and a common pivotal support for said means so that they have corresponding angular movements, said first and second means being so constructed and arranged that substantially constant lift is achieved with variable resistance at each such device.

CLOYD P. CLEVENGER.
WALTON CLEVENGER.

REFERENCES CITED

The following references are of record in the file of this patent:

UNITED STATES PATENTS

| Number | Name | Date |
|---|---|---|
| 1,184,890 | Stevens | May 30, 1916 |
| 1,404,129 | Leigh | Jan. 17, 1922 |
| 1,545,808 | Ajello | July 14, 1925 |
| 1,600,671 | Hill | Sept. 21, 1926 |
| 1,664,204 | Fokker | Mar. 27, 1928 |
| 1,862,421 | O'Malley | June 7, 1932 |
| 1,945,254 | Bittner | Jan. 30, 1934 |
| 2,111,481 | Pitt | Mar. 15, 1938 |

FOREIGN PATENTS

| Number | Country | Date |
|---|---|---|
| 343,630 | Great Britain | Feb. 26, 1931 |
| 351,439 | Germany | Aug. 18, 1922 |